United States Patent
Roach et al.

(10) Patent No.: US 8,499,035 B2
(45) Date of Patent: Jul. 30, 2013

(54) METHODS, SYSTEMS AND COMPUTER READABLE MEDIA FOR PROVIDING SESSION INITIATION PROTOCOL (SIP) EVENT WATCHER ENTITY INFORMATION IN A COMMUNICATIONS NETWORK

(75) Inventors: Adam Boyd Roach, Dallas, TX (US); Robert James Sparks, Plano, TX (US); Ben Allen Campbell, Irving, TX (US); Ajay Padmakar Deo, Carrollton, TX (US); Sam Eric McMurry, Richardson, TX (US)

(73) Assignee: Tekelec, Inc., Morrisville, NC (US)

( * ) Notice: Subject to any disclaimer, the term of this patent is extended or adjusted under 35 U.S.C. 154(b) by 131 days.

(21) Appl. No.: 12/985,967

(22) Filed: Jan. 6, 2011

(65) Prior Publication Data

US 2011/0167152 A1 Jul. 7, 2011

Related U.S. Application Data

(60) Provisional application No. 61/292,843, filed on Jan. 6, 2010.

(51) Int. Cl.
*H04L 29/00* (2006.01)
(52) U.S. Cl.
USPC ........................................ 709/203; 709/223
(58) Field of Classification Search
USPC .................................. 709/201–205, 223, 224
See application file for complete search history.

(56) References Cited

U.S. PATENT DOCUMENTS

| | | | | |
|---|---|---|---|---|
| 5,768,523 A * | 6/1998 | Schmidt | ........................ | 709/224 |
| 7,801,986 B2 * | 9/2010 | Lybeck et al. | ................ | 709/224 |
| 8,060,572 B2 * | 11/2011 | Brown et al. | ................ | 709/206 |
| 2002/0035605 A1 * | 3/2002 | McDowell et al. | ........... | 709/206 |
| 2002/0055967 A1 * | 5/2002 | Coussement | ................. | 709/202 |
| 2002/0055975 A1 * | 5/2002 | Petrovykh | ..................... | 709/205 |
| 2002/0062345 A1 | 5/2002 | Guedalia et al. | | |
| 2002/0073150 A1 * | 6/2002 | Wilcock | ........................ | 709/204 |
| 2003/0041101 A1 * | 2/2003 | Hansche et al. | ............. | 709/203 |
| 2003/0215080 A1 | 11/2003 | Wengrovitz | | |
| 2003/0217142 A1 * | 11/2003 | Bobde et al. | ................. | 709/224 |

(Continued)

OTHER PUBLICATIONS

Notification of Transmittal of the International Search Report and the Written Opinion of the International Searching Authority, or the Declaration for International Application No. PCT/US2011/020407 (Sep. 26, 2011).

(Continued)

*Primary Examiner* — Lisa Lewis
(74) *Attorney, Agent, or Firm* — Jenkins, Wilson, Taylor & Hunt, P.A.

(57) ABSTRACT

Methods, systems, and computer readable media system for collecting and distributing session initiation protocol (SIP) event watcher entity subscription information in a communications network are disclosed. According to one aspect, a system includes one or more notifier servers for receiving subscription requests for SIP event information associated with a plurality of watched entities from a plurality of watcher entities. The system further includes a watcher information (WINFO) server for receiving, from the notifier servers, SIP event subscription information that includes, for each watcher entity, an association between the watcher entity to each of the watched entities in which a subscription for SIP event information was requested by the watcher entity, for storing the SIP event subscription information in the WINFO server, for receiving, from one of the watched entities, a request for watcher entity subscription information associated with the requesting watched entity from one of the watched entities, and for accessing the SIP event subscription information to locate the watcher entity subscription information associated with the requesting watched entity.

24 Claims, 12 Drawing Sheets

U.S. PATENT DOCUMENTS

| | | | |
|---|---|---|---|
| 2004/0133641 | A1 | 7/2004 | McKinnon et al. |
| 2005/0289097 | A1* | 12/2005 | Trossen et al. .................... 707/1 |
| 2008/0065652 | A1 | 3/2008 | McCann et al. |
| 2009/0106437 | A1 | 4/2009 | Mostafa et al. |
| 2009/0143086 | A1* | 6/2009 | Jeong ............................ 455/466 |
| 2009/0177729 | A1* | 7/2009 | Ben Ezra et al. ............. 709/202 |
| 2009/0276522 | A1* | 11/2009 | Seidel ........................... 709/224 |
| 2009/0282005 | A1* | 11/2009 | Kim et al. .......................... 707/3 |
| 2009/0292790 | A1 | 11/2009 | Salonikios |
| 2009/0319655 | A1 | 12/2009 | Viamonte Sole |
| 2009/0327494 | A1 | 12/2009 | Ben-Ezra et al. |
| 2010/0198742 | A1* | 8/2010 | Chang et al. .................. 705/319 |
| 2010/0332647 | A1 | 12/2010 | Agulnik et al. |
| 2011/0138054 | A1 | 6/2011 | Ben-Ezra et al. |
| 2011/0167172 | A1 | 7/2011 | Roach et al. |

OTHER PUBLICATIONS

Roach, "Session Initiation Protocol (SIP)—Specific Event Notification," Network Working Group, RFC 3265 (Jun. 2002).

Non-Final Office Action for U.S. Appl. No. 12/986,118 (Aug. 21, 2012).

Cheng et al., "Efficient Failover and Load Balancing for Dependable SIP Proxy Servers," IEEE, pp. 1153-1158.

Wu et al., "A Fast Failure Detection and Failover Scheme for SIP Availability Networks," 13th IEEE International Symposium on Pacific Rim Dependable Computing, pp. 187-190 (Dec. 2007).

Rosenberg, "A Watcher Information Event Template-Package for the Session Initiation Protocol (SIP)," RFC 3857, pp. 1-20 (Aug. 2004).

\* cited by examiner

| WATCHED SUBSCRIBER ID | WATCHER SUBSCRIBER ID | PS SERVING WATCHER |
|---|---|---|
| SUBSCRIBER A | SUBSCRIBER D | PS1 |
| SUBSCRIBER A | SUBSCRIBER E | PS3 |
| SUBSCRIBER B | SUBSCRIBER E | PS3 |
| SUBSCRIBER C | SUBSCRIBER D | PS1 |

METHODS, SYSTEMS AND COMPUTER READABLE MEDIA FOR PROVIDING SESSION INITIATION PROTOCOL (SIP) EVENT WATCHER ENTITY INFORMATION IN A COMMUNICATIONS NETWORK

RELATED APPLICATIONS

The present application claims the benefit of U.S. Provisional Patent Application Ser. No. 61/292,843, filed Jan. 6, 2010, the disclosure of which is incorporated herein by reference in its entirety.

TECHNICAL FIELD

The subject matter described herein relates to session initiation protocol (SIP) event subscription and notification. More particularly, the subject matter described herein relates to systems, methods, and computer readable media for providing SIP event watcher entity information in a communications network.

BACKGROUND

A session initiation protocol (SIP) event notification system as disclosed in Request for Comments (RFC) 3265 includes a network architecture that permits SIP nodes to request notifications from remote nodes which indicate whether certain events (e.g., change in state information) have occurred in a given end node. Namely, SIP entities may subscribe to the state of a resource associated with a remote node (e.g., a watched subscriber or resource entity), and a notifier node/server associated with the remote node can send a notification if a state change occurs. For example, a SIP entity may send a SIP SUBSCRIBE message to request a SIP event subscription (e.g., a presence state subscription) to a notifier node that services the end node. A notifier node associated with the end node may then be configured to return the current state information (e.g., presence state information) of the node (and updates to the state information) up until the subscription expires. Notably, the SIP events model is a "soft-state" model where subscriptions are not permanent and are configured to expire after a predefined amount of time and must be renewed by subsequent subscription (e.g., SIP SUBSCRIBE) messages.

In addition to providing SIP event information associated with watched subscribers or resources, a notifier node/server can also be adapted to provide watcher information (WINFO) to the watched subscriber or resource entity. Problems arise, however, in scenarios where multiple SIP event servers (e.g., presence state servers) are deployed to handle subscription request transactions related to a watched subscriber entity. Namely, responding to watcher information requests become difficult because there isn't a single SIP event server (e.g., a presence server) that has a complete view of all watcher entities that are subscribed to a particular watched entity. In short, multiple SIP event servers may be handling the subscription request transactions related to a single watched subscriber entity. This is particularly problematic because current specifications typically do not allow a watched subscriber entity to discover and contact the full set of servicing SIP event servers in order to acquire all of the watcher subscriber information associated with that requesting watched subscriber entity.

Accordingly, there exists a need for improved methods, systems, and computer readable media for providing SIP event watcher entity information in a communications network.

SUMMARY

According to one aspect, the subject matter described herein includes a system for collecting and distributing session initiation protocol (SIP) event watcher entity subscription information in a communications network are disclosed. In one embodiment, the system includes one or more notifier servers for receiving subscription requests for SIP event information associated with a plurality of watched entities from a plurality of watcher entities. The system further includes a watcher information (WINFO) server for receiving, from the notifier servers, SIP event subscription information that includes, for each watcher entity, an association between the watcher entity to each of the watched entities in which a subscription for SIP event information was requested by the watcher entity, for storing the SIP event subscription information in the WINFO server, for receiving, from one of the watched entities, a request for watcher entity subscription information associated with the requesting watched entity from one of the watched entities, and for accessing the SIP event subscription information to locate the watcher entity subscription information associated with the requesting watched entity.

The subject matter described herein for collecting and distributing session initiation protocol (SIP) event watcher entity subscription information in a communications network may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
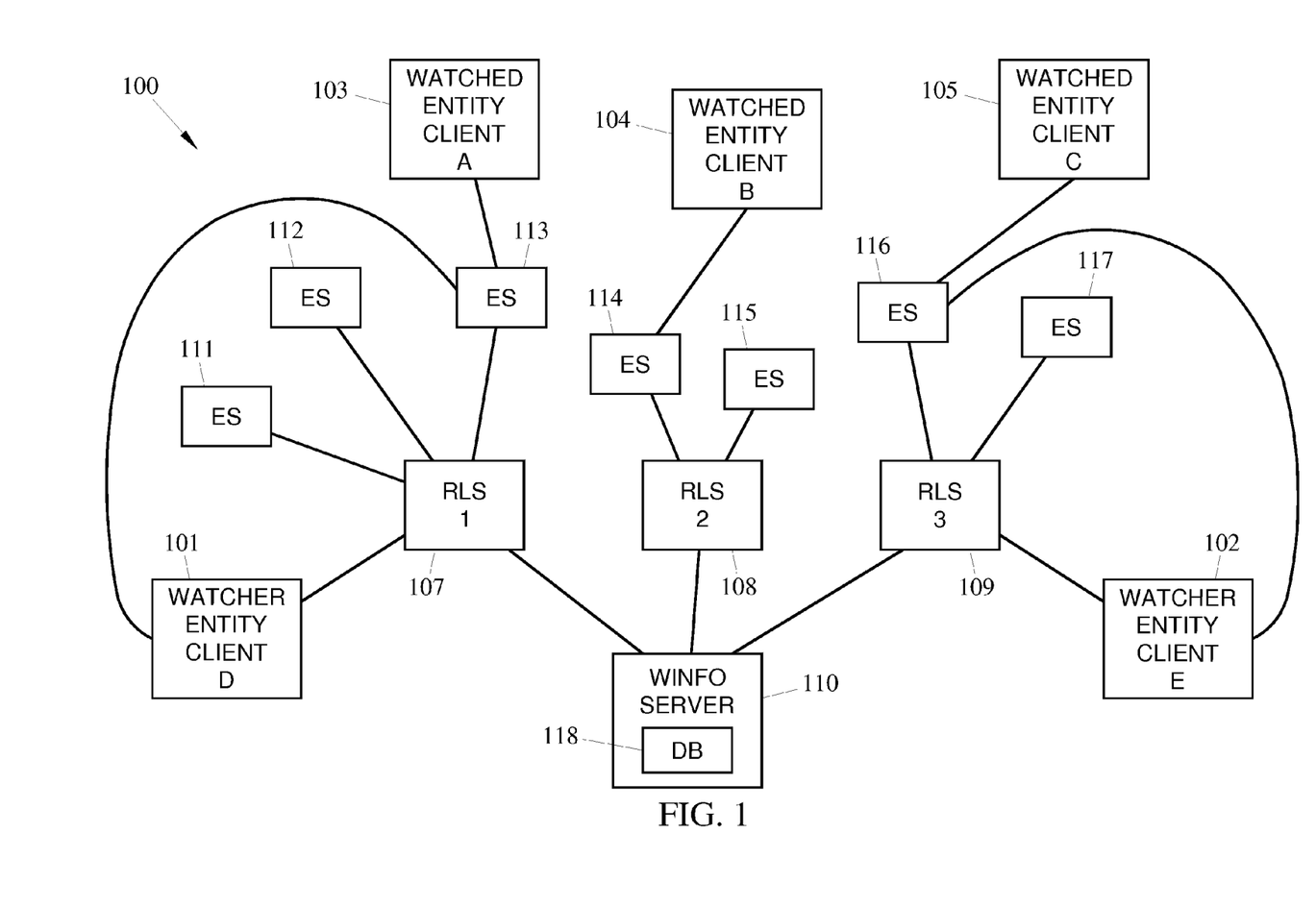
FIG. 1 is block diagram illustrating an exemplary system for providing SIP event watcher entity information in a communications network according to an embodiment of the subject matter described herein.

FIG. 1 depicts an exemplary communications network 100 that facilitates the collection and distribution of session initiation protocol (SIP) event watcher entity information. In one embodiment, communications network 100 may include watcher entity clients 101-102, watched entity clients 103-105, a plurality of notifier servers (e.g., resource list servers 107-109), a watcher information (WINFO) server 110, and a plurality of SIP event servers 111-117. In general, watcher information (WINFO) server 110 is configured to collect SIP event subscription information from the plurality of notifier servers, such as resource list servers 107-109. Similarly, each of RLS servers 107-109 may be configured to interface with a common event server or a pool of event servers, such as SIP event servers 111-117. In one embodiment as shown in FIG. 1, SIP event servers 111-117 may be presence state service servers, which are responsible for receiving and maintaining presence state information associated with watched entities clients 103-105. Although the present specification primarily uses presence service as an exemplary SIP event service, other SIP event services may be handled in a similar fashion by communications network 100 without departing from the scope of the present subject matter. Other SIP event subscription services may include presence subscription service, dialog subscription service, voice mail subscription information, automatic callback subscription service, PSTN and Internet Internetworking (PINT) subscription service, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, XCAP document change information, or any other event packages as that term is defined by RFC 3625 and its successor documents (if any).

In one embodiment, each of watcher entity client 101 and a watcher entity client 102 may comprise a computer, mobile device, or similar client machine configured to run a user agent or client software program, function, or module for accessing network servers. In one embodiment, watcher entity client 101 is associated with a watcher subscriber entity (e.g., watcher subscriber entity D) and is configured to create and send SIP SUBSCRIBE requests to a notifier server entity (e.g., a resource list server or a presence server, depending on the embodiment). The SIP SUBSCRIBE requests are subscription messages that request a SIP event subscription for change in state notifications related to one or more watched entities. In one embodiment, the SIP event subscriptions may include presence state service subscriptions (e.g., a SIP request to add a watched subscriber entity to a watcher subscriber entity's "buddy list"). In a SIP event notification architecture, these subscription requests require approval from watched entity clients. As shown in FIG. 1, a watcher entity client (e.g., client 101) may have a direct association or connection to a SIP event server (e.g., event server 113). It should also be noted that network 100 may include watcher clients that are subscribed to RLSs and SIP event servers, concurrently.

Similarly, each of watched entity client 103, watched entity client 104, and watched entity client 105 may comprise a computer, mobile device, or similar client machine configured to run a user agent or client software program, function, or module for accessing network servers. In one embodiment, watched entity client 103 is associated with a watched subscriber entity (e.g., watched subscriber A) and is configure to provide SIP event information (e.g., presence state information and updates) to a designated event server 113 (e.g., presence server). Although not explicitly shown in FIG. 1, watched entity client 103 may be configured to send SIP messages to a notifier server (e.g., RLS 107) that requests watcher entity information associated with watched entity A (e.g., watched entity client 103 requests a list of watcher entities that are either receiving the presence state information related to watched entity A or have requested to subscribe to watched entity A's presence information).

FIG. 1 also depicts a plurality of SIP event servers 111-117. AS shown in FIG. 1, each of SIP event servers 111-117 may be communicatively coupled to an RLS server. In one embodiment, a SIP event server may be a presence server that is configured to collect and manage the presence state information of a watched subscriber entity and provide current presence state information and present state updates to one or more RLSs. In an alternate embodiment, communications network 100 may not employ RLSs 107-109. In such a case, SIP event servers 111-117 may function as notifier servers and directly communicate with watcher and watched entities. SIP event severs 111-117 may also be configured to provide watcher entity subscription information to WINFO server 110 when RLS servers are not employed in network 100.

In one embodiment, SIP event servers 111-117 collect SIP event state data from a plurality of watched subscriber or resource entities (e.g., watched entities 103-105). In one embodiment, a SIP event server may be a presence server that receives presence state information from one or more watched entities. For example, watched entity 103 may provide presence state information by publishing its current presence state using a status string and providing this information to SIP event server 113 (which in this case is a presence service server). In response to receiving the presence state information, SIP event server 113 may serve a "presence state document" to presence subscribers (i.e., watcher entities) of watched subscriber entity 103 or to RLSs. Presence server 103 is also configured to receive XML based presence rules from watched subscriber entity A. In one embodiment, SIP event server 113 maintains a set of presence rules for each subscription to each resource. For example, the presence rules associated with watched subscriber entity 103 may be modified such that a unique set of presence rules may exist for each of the watcher entities of watched subscriber entity A. For example, subscription refresh rules and/or the type of presence state information provided to one watcher entity client may differ from what is provided to a second watcher entity client. Moreover, a presence server may also be configured to receive publication information from different presence sources associated with the same watched subscriber entity. For example, presence server 113 may receive presence state updates related to watched subscriber A's client devices in the form of GPS location data, a text string, or a Web server connected to a calendar.

FIG. 1 also depicts a plurality of resource list servers (RLSs) 107-109 that function as notifier server entities in communications network 100. Although only three RLSs are depicted in FIG. 1, any number of RLSs may be employed without departing from the scope of the present subject matter. In an alternate embodiment, network 100 may also utilize zero RLS entities and instead only employ presence servers. In one embodiment, RLS 107 functions as a notifier server in communications network 100 that receives SIP SUBSCRIBE requests sent by one or more watcher entity clients, e.g., watcher client 101. Similarly, RLS 107 may also generate SIP NOTIFY messages for the purpose of informing watcher entity client 101 or any other watcher subscriber or resource entity of the state (or change in state) of a watched resource (e.g., the current presence state of a watched subscriber entity).

Typically, a resource list server (RLS) is used to store a list of watched subscriber or resource entities in which a watcher entity is interested in knowing "change in state" information. For example, an associated watcher entity client may create a resource list (e.g., a buddy list) of watched entities that is stored in an RLS. The watcher entity client may then subscribe to the list in order to obtain SIP event information (e.g., presence state information) and updates regarding the watched subscribers on the list. Upon receiving the resource list from the watcher client, the RLS attempts to acquire the SIP event information by communicating with the SIP event servers that maintain the requested SIP event information. After obtaining the SIP event information, the RLS sends a SIP NOTIFY message to the watcher entities with the current SIP event states of the different watched entities. Also, prior to the SIP event subscription expiring, an RLS may also be configured to send SIP event state updates to the watcher entities as the RLS receives them from the event servers. In the present subject matter, however, an RLS is used to provide SIP event subscription information to WINFO server 110. The RLS creates the SIP event subscription information from receiving subscription requests from watcher entities requesting a subscription to change in state information pertaining to one or more watched entities. An RLS server may also be configured to request watcher entity subscription information on behalf of a requesting watched entity. For example, RLS 107 may receive a request for watcher information from a watched entity client 103 associated with a watched subscriber A. RLS 107 may then subsequently forward that request to WINFO server 110.

Figure 3:
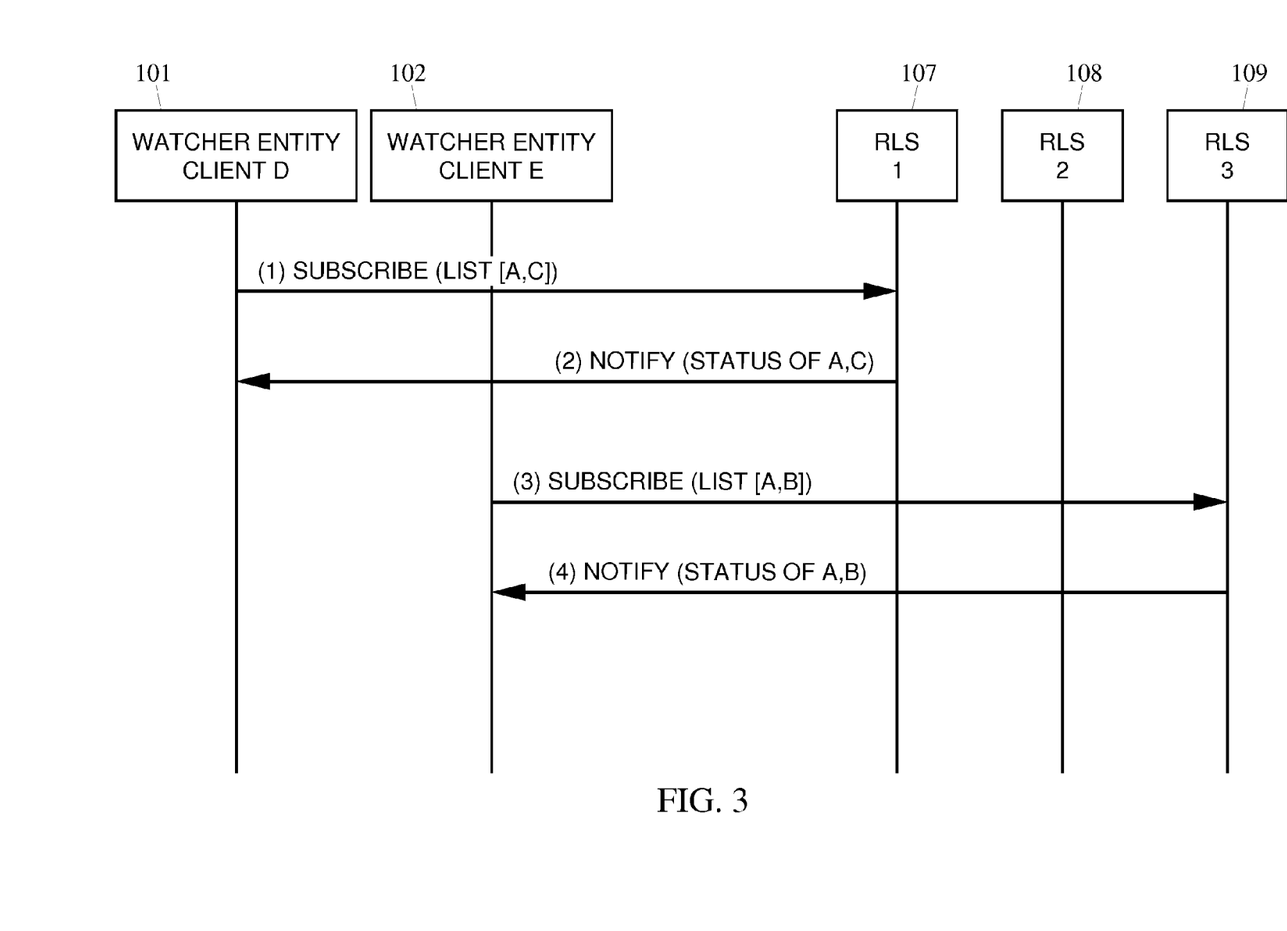
FIG. 3 is a signaling flow diagram illustrating a resource list server receiving a request for presence information according to an embodiment of the subject matter described herein.

In one embodiment, watcher information (WINFO) server 110 is a designated server, network element, or node that is configured to receive SIP event subscription information from notifier servers, such as an RLS or SIP event server depending on the embodiment. As mentioned above, the SIP event subscription information is generated by an RLS and may include which watcher entities are subscribed, or have requested a subscription, to the SIP event information and updates pertaining to one or more watched entities. In one embodiment, the SIP event subscription information communicated to WINFO server 110 includes watcher entity identifiers, watched subscriber entity identifiers, and subscription details. Upon receipt, WINFO server 110 provisions a database 118 with the communicated SIP event subscription information. An exemplary WINFO database is shown in FIG. 3 (see description of FIG. 3 below).

WINFO server 110 may also be configured to distribute a specific portion of the SIP event subscription information (as watcher entity subscription information) to requesting watched entities. Specifically, after being provisioned with the SIP event subscription information, WINFO server 110 may receive requests for watcher entity identification information from watched entities via an RLS server. For example, RLS server 107 receives requests for watcher information from a watched subscriber entity. RLS server 107 then forwards the watcher entity information request from the watched subscriber entity to WINFO server 110 (which is authoritative for the requesting subscriber).

In one embodiment, watcher information (WINFO) server 110 may be configured to handle WINFO SIP metadata event packages. A WINFO event package allows a watched entity client (e.g., watched entity client 103) associated with a watched subscriber (e.g., watched subscriber A) to subscribe and obtain watcher entity subscription information that identifies one or more watcher entities that are subscribed to receive (or have made a request to receive) the watched subscriber's presence information. Notably, a WINFO event package or "WINFO document" is created and sent to the requesting watched entity client so as to notify the associated watched subscriber of the watcher entities that are subscribed to the presence state information related to the watched subscriber entity or attempting to add that watched subscriber entity to a buddy list. In one embodiment, the WINFO document includes a list of subscribed watcher entities and further indicates 1) which watcher entities are presently "online" and/or have associated watcher entity clients running, 2) a list of watcher entities that have issued a subscription request to the watched subscriber entity's presence information, 3) the amount of time remaining for all outstanding presence state subscriptions, 4) and a list of all SIP event subscriptions that are currently in a pending state (i.e., not approved).

The advantage of using a WINFO server in a communications network is that subscription permissions may be eased. Furthermore, the use of different overload queuing techniques may be employed since the amount of subscription traffic at the WINFO server is considerably smaller as compared to a SIP event server (e.g., only the watched entity will be subscribing to a WINFO server for watcher information that is associated with the requesting watched subscriber). Furthermore, the logic associated with accepting and enforcing subscriptions may be generated and supported with greater ease. Although FIG. 1 only depicts a single WINFO server 110 that is authoritative of watched entities 103-105, additional WINFO servers authoritative of additional watched entities may be utilized in communications network 100 without departing from the scope of the present subject matter.

Figure 2:
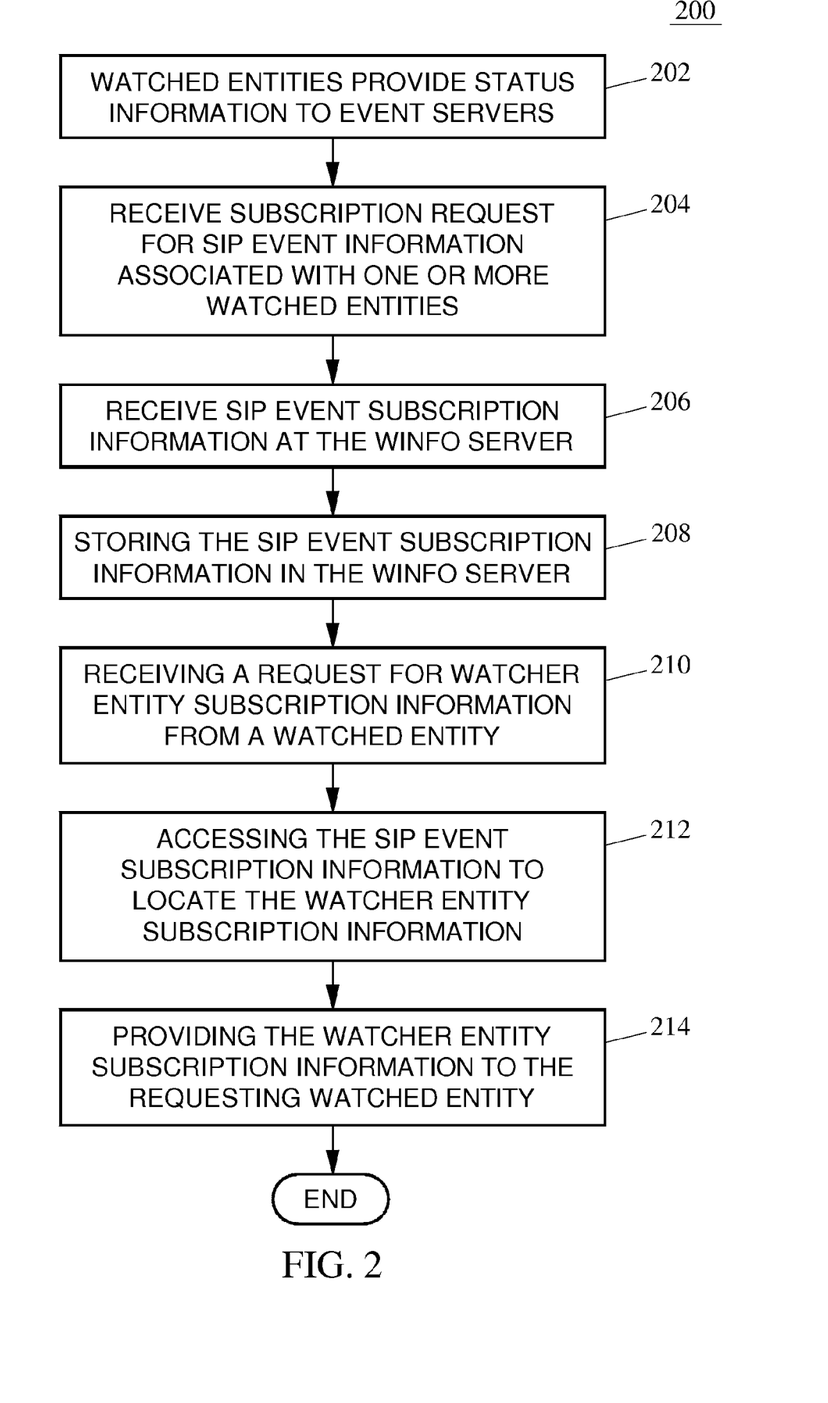
FIG. 2 is a flow chart illustrating an exemplary process for providing SIP event watcher entity information in a communications network according to an embodiment of the subject matter described herein.

FIG. 2 is a flow chart illustrating an exemplary method 200 for providing watcher entity information according to an embodiment of the subject matter described herein. In block 202, event servers are provisioned with SIP event status information from one or more clients associated with watched entities. In one embodiment, the events servers may include presence service servers, each of which is provisioned with presence status information from the plurality of watched subscriber entities over a period of time. In one embodiment, a presence server receives presence information when the client of a watched subscriber entity publishes its current state with a status string.

In block 204, a subscription request for SIP event information associated with one or more watched entities is received at a notifier server, such as an RLS, or alternatively, a presence server if an RLS is not utilized in the network. In one embodiment, an RLS server may receive a presence service subscription request message from a client associated with a watcher entity. For example, FIG. 3 depicts a signaling diagram in which watcher entity client 101 sends a presence service subscription request message (i.e., a SUBSCRIBE message) to RLS 107. Namely, the presence service subscription request message sent to RLS 107 indicates that watcher entity client 101 wants to subscribe to presence status information for watched entities A and C. In one embodiment, the SUBSCRIBE message includes a list of identifiers associated with watched entities A and C. Similarly, FIG. 3 also depicts a watcher entity client 102 that sends, to RLS 109, a presence service subscription request message (i.e., a SUBSCRIBE message) for subscribing to presence status information for watched entities A and B. FIG. 3 also shows RLS 107 replying to the SUBSCRIBE message with a NOTIFY message, which indicates the presence status of watched entities A and C. RLS 107 may send the NOTIFY message to watcher entity client 101 if RLS 107 already has the current present state information for watched entities A and C stored locally. Otherwise, RLS 107 must obtain the presence state information from the appropriate presence servers.

Figure 4:
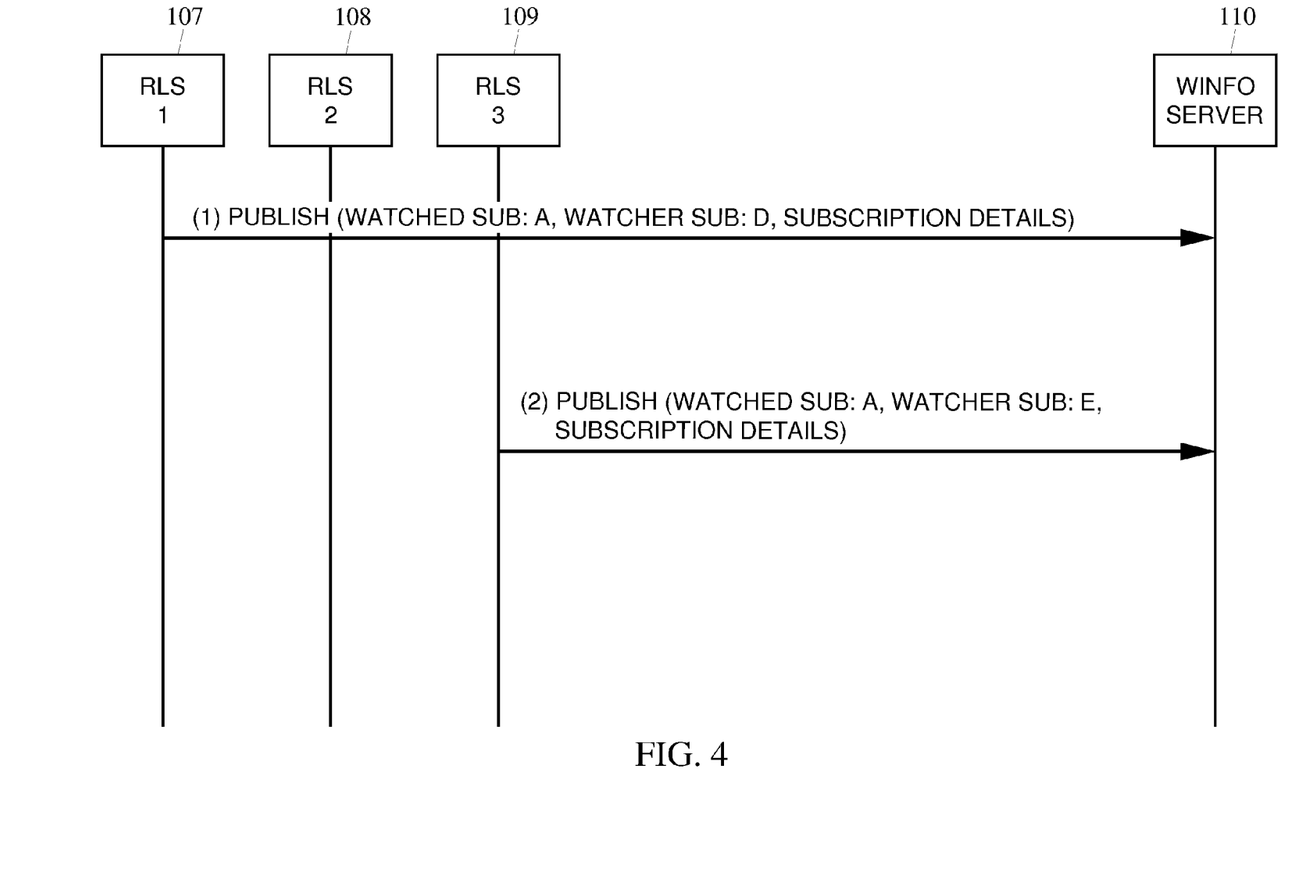
FIG. 4 is a signaling flow diagram illustrating a watcher information server receiving presence subscription information according to an embodiment of the subject matter described herein.

Returning to FIG. 2, in block 206, SIP event subscription information associated with the subscription request is received at a WINFO server. In one embodiment, a WINFO server 110 receives presence subscription information associated with a subscription request sent to RLS 107. For example, FIG. 4 depicts RLS 107 communicating presence subscription information to WINFO server 110, which may be authoritative for watcher entity A. Although FIG. 4 depicts an RLS 107 sending a SIP PUBLISH message to communicate the presence subscription information, it should be understood that any other similar mechanism or message may be utilized without departing from the scope of the present subject matter. Specifically, FIG. 4 illustrates that the presence subscription information received by WINFO server 110 includes a watcher entity identifier (for watcher entity D), a watched entity identifier (for watched subscriber A), and subscription details. In one embodiment, the subscription details may include the SIP subscription dialog information (i.e., To and From header field values including tags, Call-ID, remote and local CSeq values, remote and local Contact values, and route-set), the current subscription status, the most recent event affecting the subscription status, and the remaining subscription duration. Similarly, FIG. 4 also depicts RLS 109 communicating a SIP PUBLISH message that includes second set of presence subscription information to WINFO server 110. Specifically, the presence subscription information from RLS 109 is shown to include a watcher entity identifier (for watcher entity E), watched entity identifier (for watched entity A), and subscription details. Notably, FIG. 4 shows that WINFO server 110 may receive presence service subscription information related to watched subscriber entity A from more than one notifier server source (e.g., an RLS or presence server).

Figure 5:
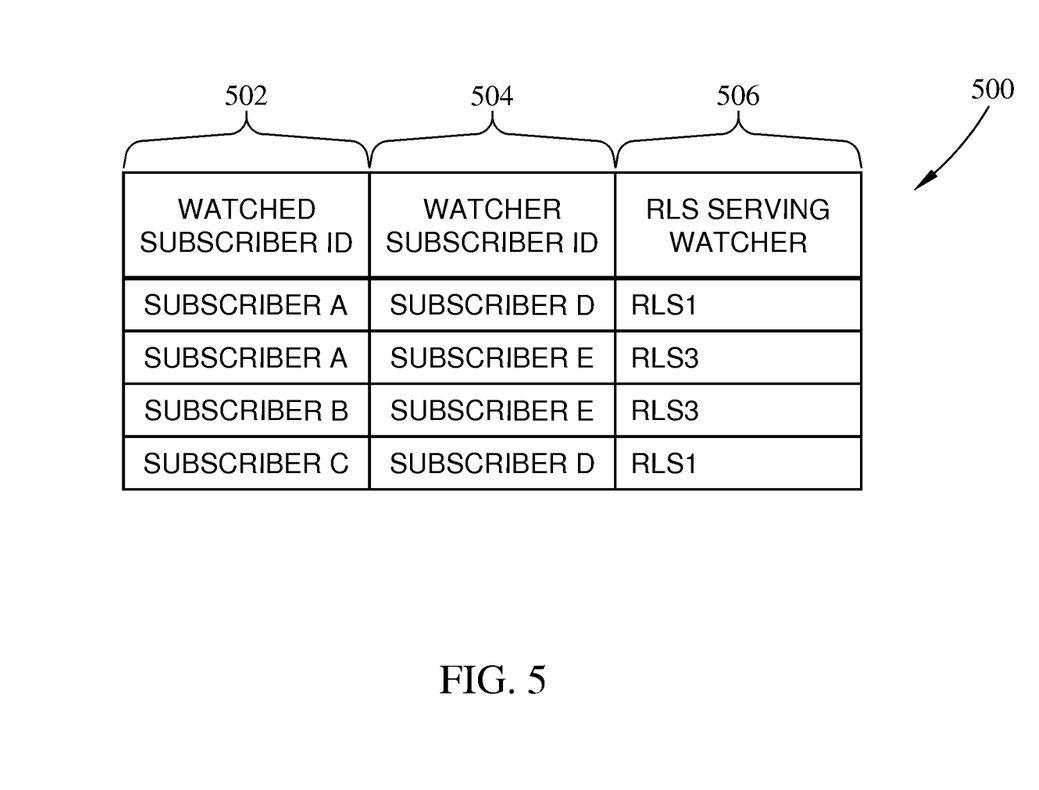
FIG. 5 is a block diagram illustrating an exemplary watcher information database according to an embodiment of the subject matter described herein.

Returning to FIG. 2, in block 208, the SIP event subscription information is stored in a WINFO server. In one embodiment, the presence service subscription information received by WINFO server 110 is stored in a database 118. For example, FIG. 5 depicts an exemplary database 500 (which is represented in FIG. 1 as database 118) which includes a column 502 that contains watched entity identifiers (i.e., watched subscriber identifiers), a column 504 that includes watcher entity identifiers (i.e., watcher subscriber identifiers), and a column 506 that includes identifiers corresponding to the RLSs serving the respective watcher entities. Although only three columns are shown in FIG. 5, additional columns may be included in database 500 without departing from the scope of the present subject matter.

Figure 6:
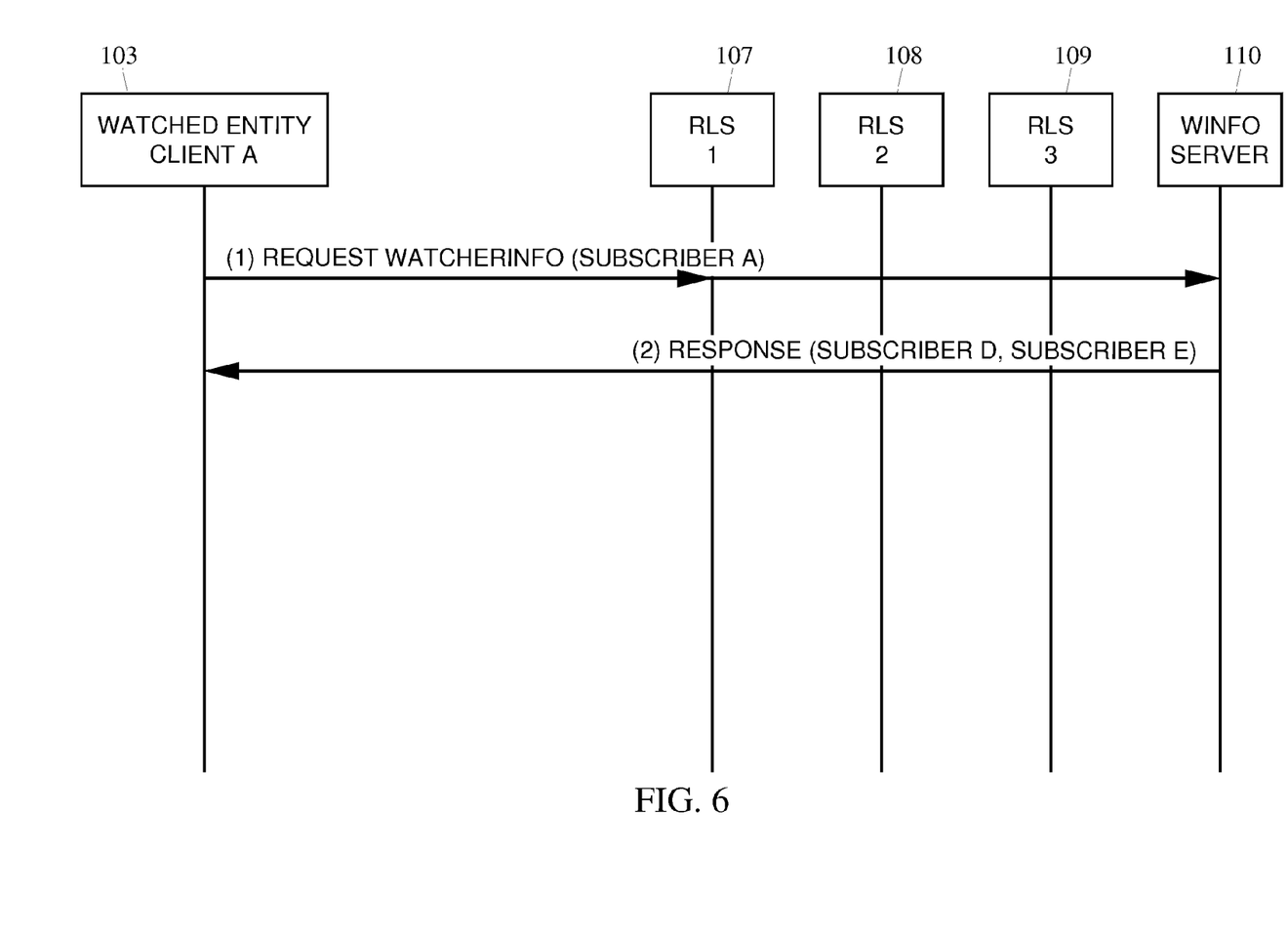
FIG. 6 is a signaling flow diagram illustrating a watcher information server receiving a request for watcher subscription information associated with the watched entity via a resource list server according to an embodiment of the subject matter described herein.
Figure 7:
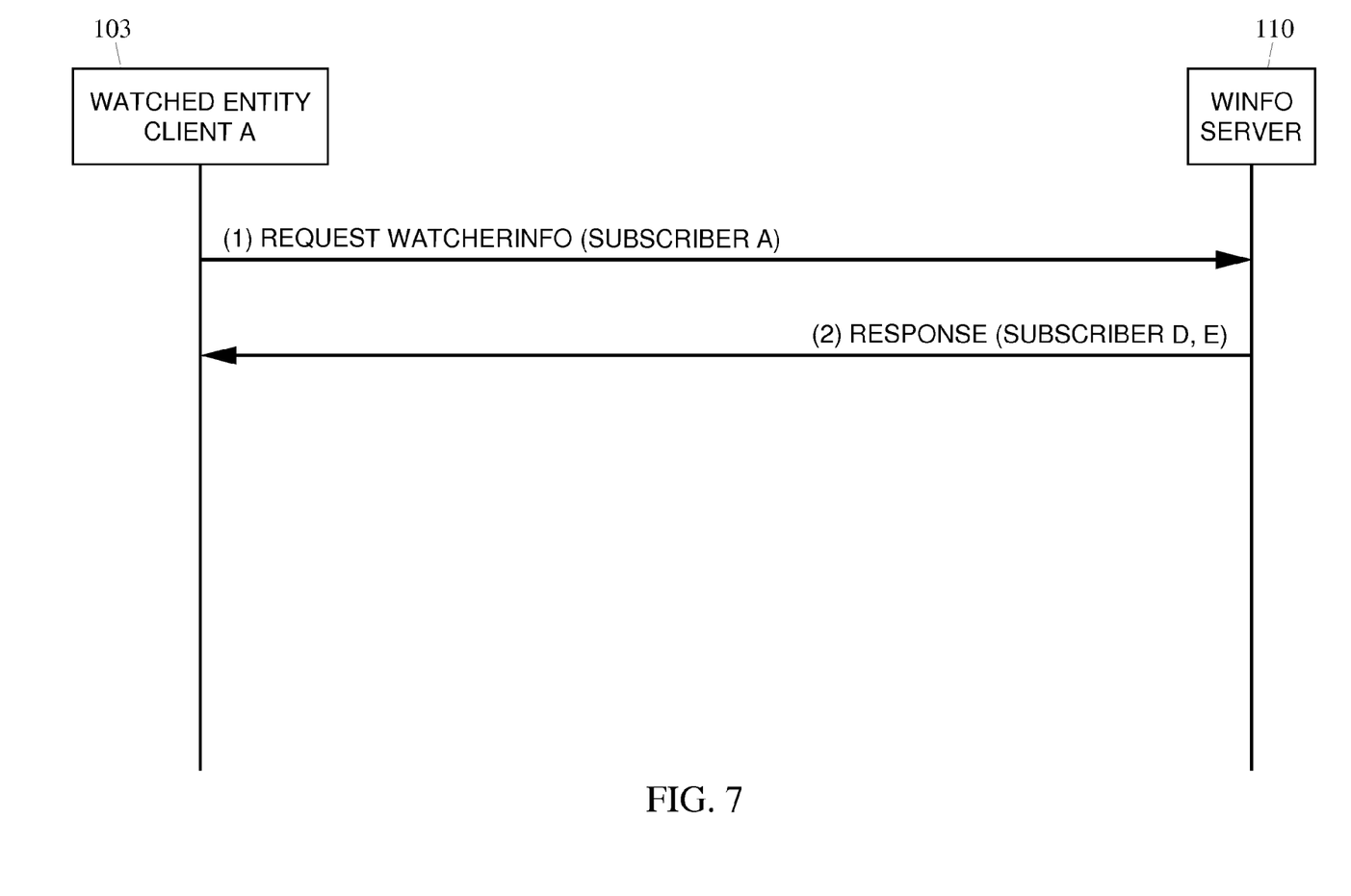
FIG. 7 is a signaling flow diagram illustrating a watcher information server receiving a request for watcher subscription information associated with a watched entity directly from the watched entity according to an embodiment of the subject matter described herein.

Returning to FIG. 2, in block 210, a request for watcher entity subscription information associated with a watched entity is received. In one embodiment, WINFO server 110 receives a request for watcher entity subscription information from the watched subscriber entity either directly or via an RLS. For example, FIG. 6 depicts RLS 107 receiving a request for watcher entity subscription information from watched entity client 103. FIG. 6 further shows that the received request message is forwarded from RLS 107 to WINFO server 110. Alternatively, FIG. 7 depicts WINFO server 110 directly receiving, from watched entity client 103 (and not via an RLS), a request for watcher entity subscription information associated with watched entity A.

Returning to FIG. 2, in block 212, the SIP event subscription information is accessed in order to locate the requested watcher entity subscription information. In one embodiment, WINFO server 110 accesses database 118 (as shown in FIG. 1) to locate stored watcher entity subscription information that is associated with the requesting watched entity. For example, WINFO server 110 queries database 118 in order to obtain an identifier for each of the watcher entities that have subscribed to the presence information for the requesting watched entity.

Returning to FIG. 2, in block 214, the watcher entity subscription information is provided to the requesting watched entity client. As shown in FIG. 6, WINFO server 110 may respond to the watcher entity subscription request from watched entity client 103 with a response message including identifiers associated with watcher entity D and watcher entity E (i.e., watcher entities that have subscribed to watched entity A's presence information). A similar response message is also depicted in FIG. 7 where the response message is sent in response to a request message sent directly from watched entity client 103 to WINFO server 110. In one embodiment, the response message may include a NOTIFY message that states which watcher entities are currently subscribed to the watched entity's presence information and the expiration times of those subscriptions and/or which entities have requested a subscription to the watched entity's presence information (i.e., pending requests awaiting approval).

Figure 8:
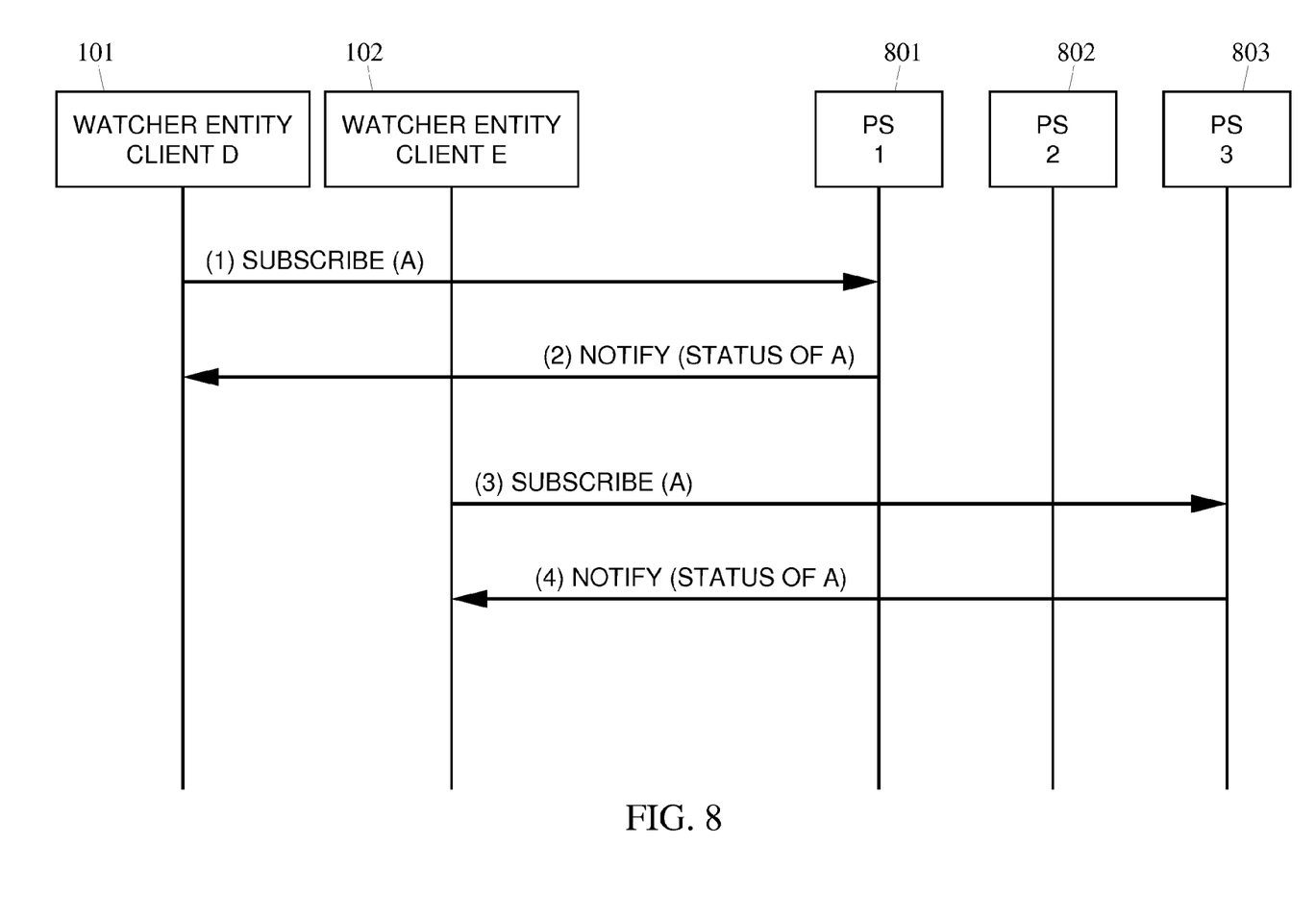
FIG. 8 is a signaling flow diagram illustrating a presence server receiving a request for presence information according to an embodiment of the subject matter described herein.

As mentioned above with regard to at least one embodiment, communications network 100 may employ notifier servers that include presence servers instead of utilizing RLSs. For example, FIG. 8 depicts a signaling diagram in which watcher entity client 101 sends a presence service subscription request message (i.e., a SUBSCRIBE message) to presence server 801. Namely, the presence service subscription request message sent to presence server 801 indicates that watcher entity client 101 wants to subscribe to presence status information for watched entity A. In one embodiment, the SUBSCRIBE message includes an identifier associated with watched entity A. Similarly, FIG. 8 also depicts a watcher entity client 102 that sends, to RLS 803, a presence service subscription request message (i.e., a SUBSCRIBE message) for subscribing to presence status information for watched entity A. FIG. 8 also shows presence server 801 replying to the SUBSCRIBE message using a NOTIFY message, which indicates the presence status of watched entity A.

Figure 9:
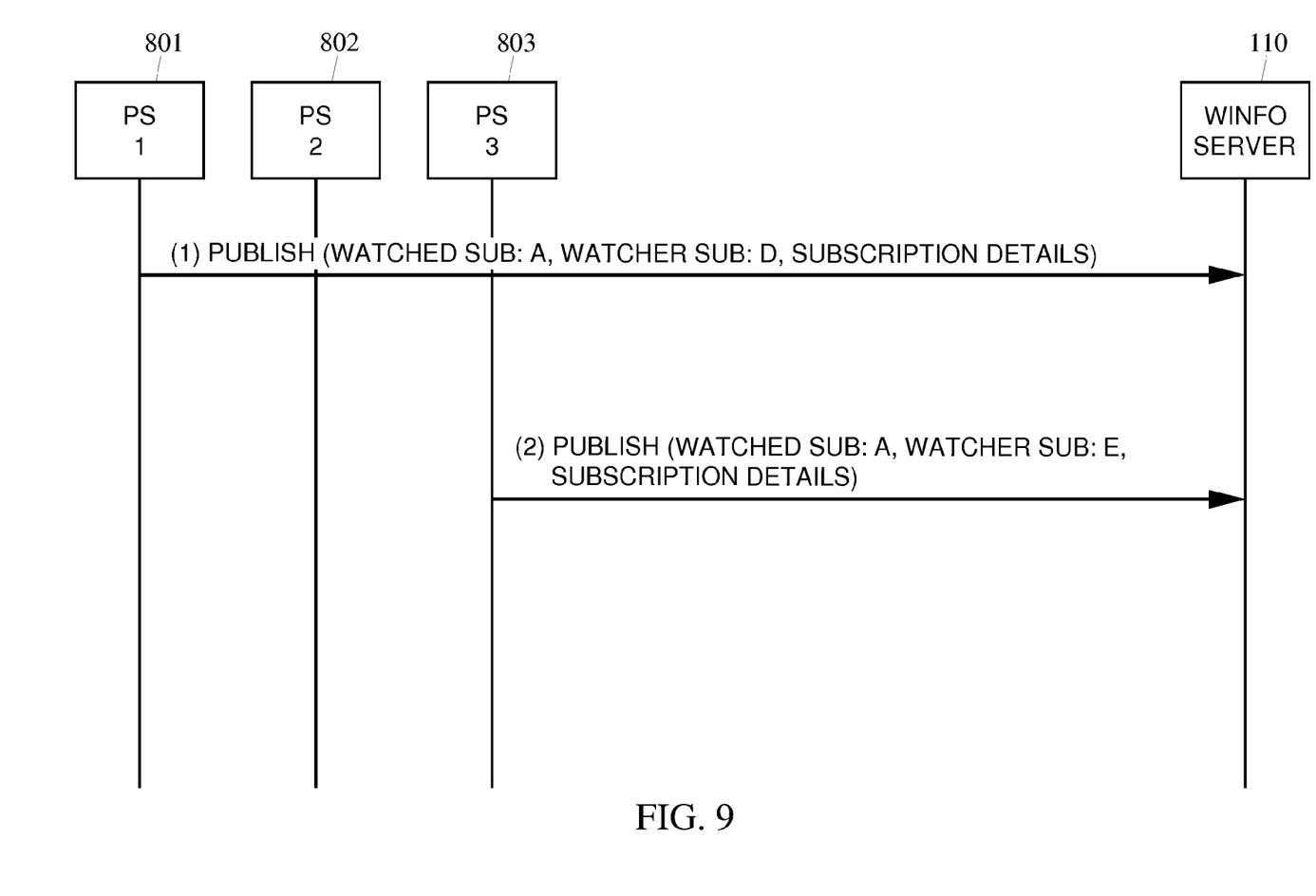
FIG. 9 is a signaling flow diagram illustrating a watcher information server receiving presence subscription information according to an embodiment of the subject matter described herein.

FIG. 9 depicts presence server 801 communicating presence subscription information to WINFO server 110, which may be authoritative for watched entity A. Although FIG. 9 depicts presence server 801 sending a SIP PUBLISH message to communicate the presence subscription information, it should be understood that any other similar mechanism or message may be utilized without departing from the scope of the present subject matter. Specifically, FIG. 9 illustrates that the presence subscription information received by WINFO server 110 includes a watcher entity identifier (for watcher entity D), a watched entity identifier (for watched subscriber A), and subscription details. Similarly, FIG. 9 also depicts presence server 803 communicating a SIP PUBLISH message that includes second set of presence subscription information to WINFO server 110. Specifically, the presence subscription information from presence server 803 is shown to include a watcher entity identifier (for watcher entity E), watched entity identifier (for watched entity A), and subscription details. Notably, FIG. 9 shows that WINFO server 110 may receive presence service subscription information related to watched subscriber entity A from more than one notifier server source (e.g., a presence server).

Figure 10:
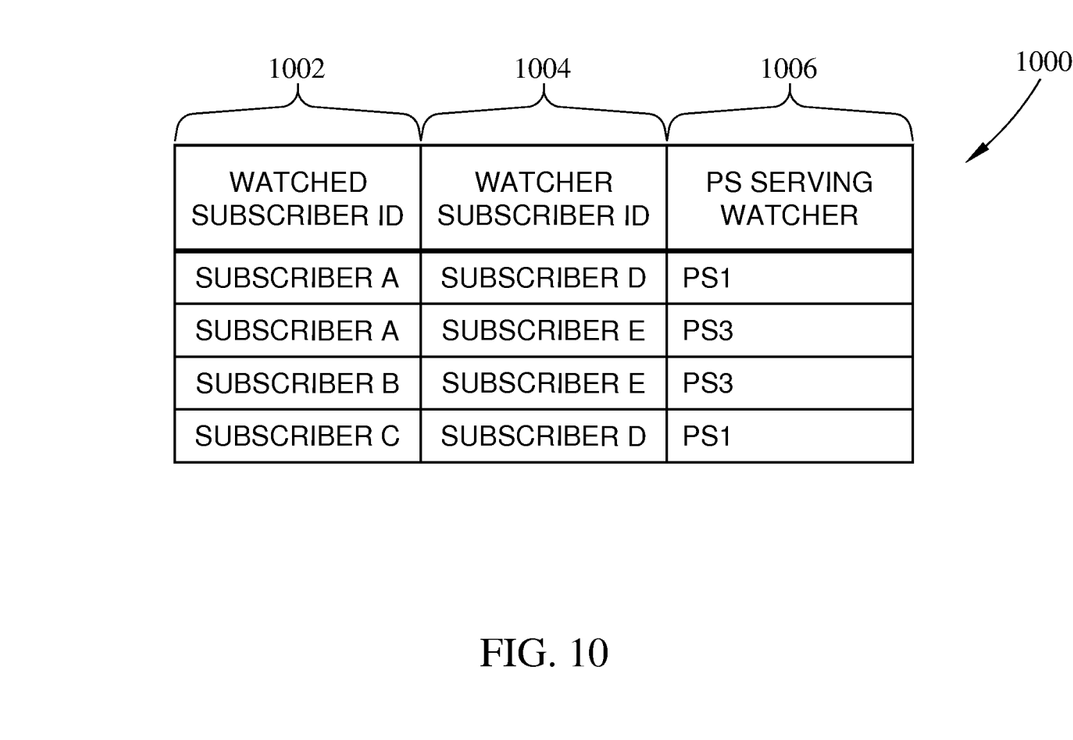
FIG. 10 is a block diagram illustrating an exemplary watcher information database according to an embodiment of the subject matter described herein.

In one embodiment, the presence service subscription information received by WINFO server 110 from the presence server is stored in database 118. For example, FIG. 10 depicts an exemplary database 1000 (which is represented in FIG. 1 as database 118) which includes a column 1002 that contains watched entity identifiers (i.e., watched subscriber identifiers), a column 1004 that includes watcher entity identifiers (i.e., watcher subscriber identifiers), and a column 1006 that includes identifiers corresponding to the presence servers serving the respective watcher entities. Although only three columns are shown in FIG. 5, additional columns may be included in database 1000 without departing from the scope of the present subject matter.

Figure 11:
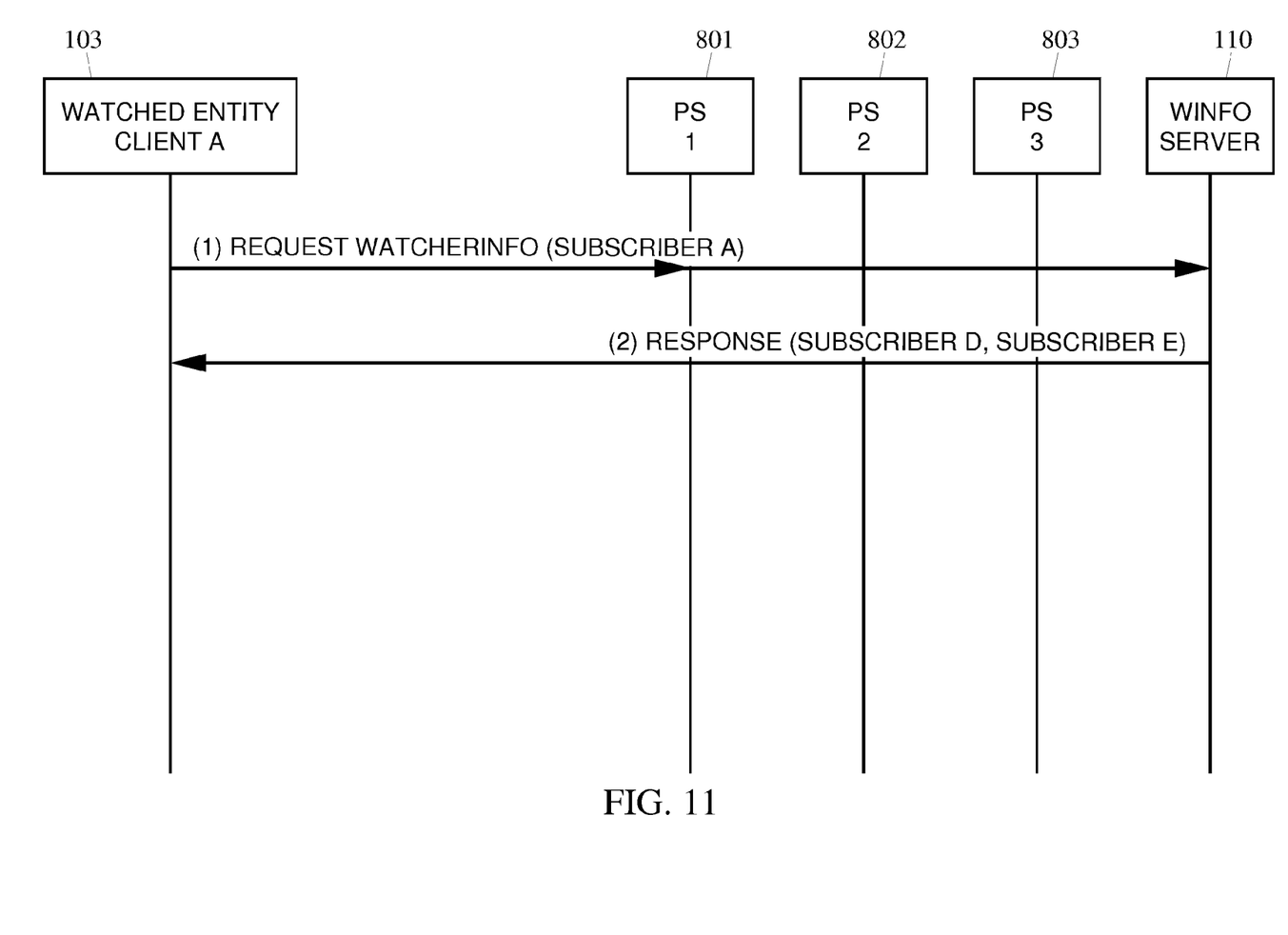
FIG. 11 is a signaling flow diagram illustrating a watcher information server receiving a request for watcher subscription information associated with the watched entity via a presence server according to an embodiment of the subject matter described herein.
Figure 12:
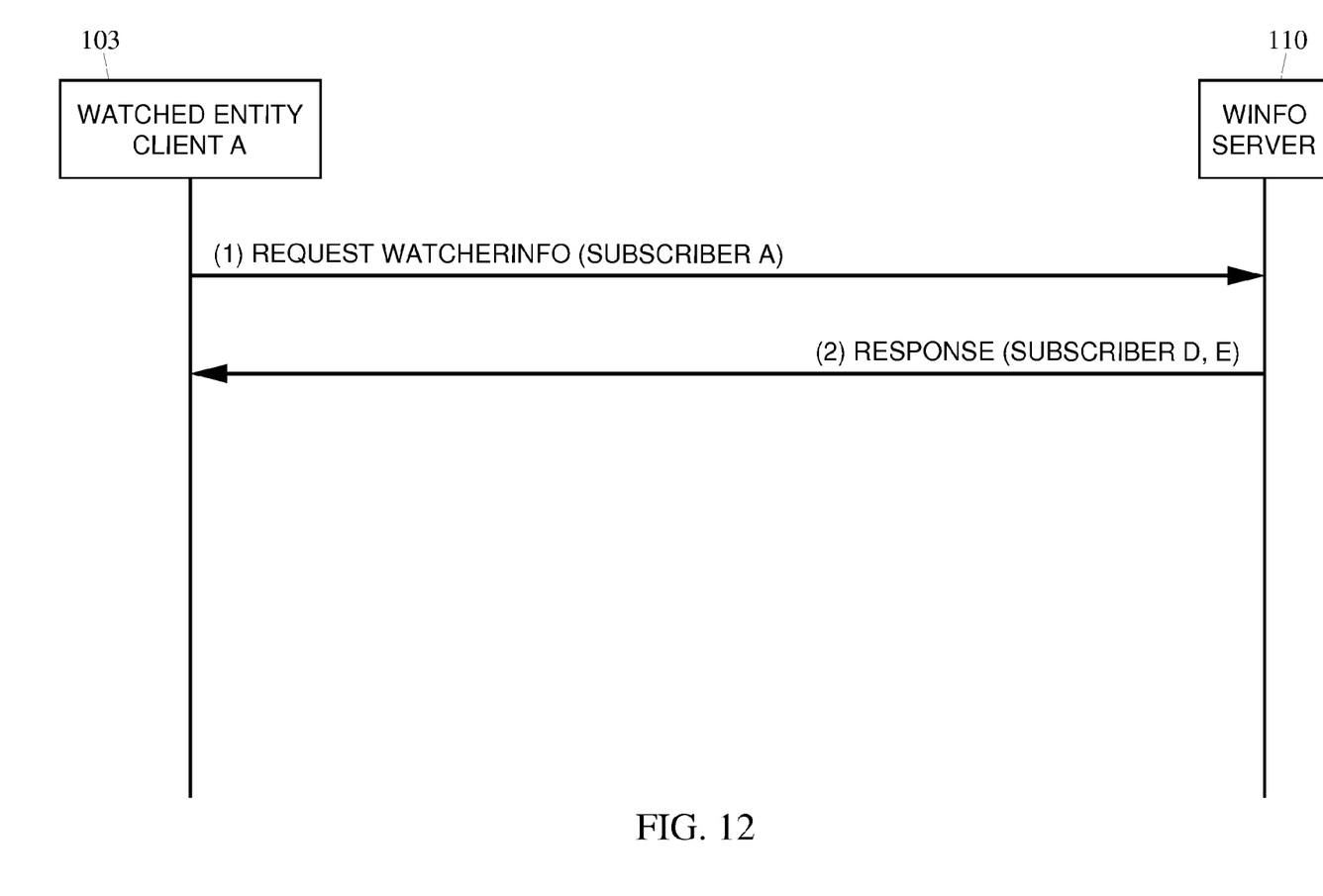
FIG. 12 is a signaling flow diagram illustrating a watcher information server receiving a request for watcher subscription information associated with a watched entity directly from the watched entity according to an embodiment of the subject matter described herein.

In one embodiment, WINFO server 110 receives a request for watcher entity subscription information from the watched subscriber entity either via a presence server. For example, FIG. 11 depicts presence server 801 receiving a request for watcher entity subscription information from watched entity client 103. FIG. 11 further shows that the received request message is forwarded from presence server 801 to WINFO server 110. Alternatively, FIG. 12 depicts WINFO server 110 directly receiving, from watched entity client 103 (and not via an RLS), a request for watcher entity subscription information associated with watched entity A.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for collecting and distributing session initiation protocol (SIP) event watcher entity subscription information in a communications network, the method comprising:

receiving, at one or more notifier servers from a plurality of watcher entities, subscription requests for SIP event information associated with a plurality of watched entities;

receiving, at a watcher information (WINFO) server from the notifier servers, SIP event subscription information that includes, for each watcher entity, an association between the watcher entity to each of the watched entities in which a subscription for SIP event information was requested by the watcher entity;

storing the SIP event subscription information in the WINFO server;

receiving, at the WINFO server from one of the watched entities, a request for watcher entity subscription information associated with the requesting watched entity, wherein the watcher entity subscription information identifies one or more watcher entities that are subscribed to receive the SIP event information associated with the requesting watcher entity;

accessing, at the WINFO server, the SIP event subscription information to locate the watcher entity subscription information associated with the requesting watched entity; and providing, to the requesting watched entity, the watcher entity subscription information associated with the requesting watched entity.

2. The method of claim 1 wherein the watcher entity subscription information includes a watcher entity identifier and at least one of: a SIP event subscription expiration time associated with the watcher entity or a pending SIP event subscription request from the watcher entity.

3. The method of claim 1 wherein the one or more notifier servers includes one or more resource list servers.

4. The method of claim 1 wherein the one or more notifier servers includes one or more presence service servers.

5. The method of claim 1 wherein the requesting watched entity includes at least one of a requesting watched subscriber entity or a requesting watched resource entity.

6. The method of claim 1 wherein the SIP event subscription information includes at least one of presence service subscription information, dialog subscription information, voice mail subscription information, automatic callback subscription information, PSTN and Internet Internetworking (PINT) subscription information, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, or XCAP document change information.

7. The method of claim 1 wherein the SIP event information includes presence service information.

8. The method of claim 1 wherein the presence service subscription information comprising a watcher entity identifier, a watched entity identifier, and subscription details.

9. A system for collecting and distributing session initiation protocol (SIP) event watcher entity subscription information in a communications network, the system comprising: one or more hardware notifier servers that receive subscription requests for SIP event information associated with a plurality of watched entities from a plurality of watcher entities; a hardware watcher information (WINFO) server, that receives from the notifier servers, SIP event subscription information that includes, for each watcher entity, an association between the watcher entity to each of the watched entities in which a subscription for SIP event information was requested by the watcher entity, that stores the SIP event subscription information in the WINFO server, that receives, from one of the watched entities, a request for watcher entity subscription information associated with the requesting watched entity from one of the watched entities, wherein the watcher entity subscription information identifies one or more watcher entities that are subscribed to receive the SIP event information associated with the requesting watcher entity, that accesses, at the WINFO server, the SIP event subscription information to locate the watcher entity subscription information associated with the requesting watched entity, and that provides to the requesting watched entity the watcher entity subscription information associated with the requesting watched entity.

10. The system of claim 9 wherein the watcher entity subscription information includes a watcher entity identifier and at least one of: a SIP event subscription expiration time associated with the watcher entity or a pending SIP event subscription request from the watcher entity.

11. The system of claim 9 wherein the one or more notifier servers includes one or more resource list servers.

12. The system of claim 9 wherein the one or more notifier servers includes one or more presence service servers.

13. The system of claim 9 wherein the requesting watched entity includes at least one of a requesting watched subscriber entity or a requesting watched resource entity.

14. The system of claim 9 wherein the SIP event subscription information includes at least one of presence service subscription information, dialog subscription information, voice mail subscription information, automatic callback subscription information, PSTN and Internet Internetworking (PINT) subscription information, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, or XCAP document change information.

15. The system of claim 9 wherein the SIP event information includes presence service information.

16. The system of claim 9 wherein the SIP event subscription information includes presence service subscription information comprising a watcher entity identifier, a watched entity identifier, and subscription details.

17. A non-transitory computer readable medium having stored thereon executable instructions that when executed by the processor of a computer control the computer to perform steps comprising:
  receiving, at one or more notifier servers from a plurality of watcher entities, subscription requests for SIP event information associated with a plurality of watched entities;
  receiving, at a watcher information (WINFO) server from the notifier servers, SIP event subscription information that includes, for each watcher entity, an association between the watcher entity to each of the watched entities in which a subscription for SIP event information was requested by the watcher entity;
  storing the SIP event subscription information in the WINFO server;
  receiving, at the WINFO server from one of the watched entities, a request for watcher entity subscription information associated with the requesting watched entity, wherein the watcher entity subscription information identifies one or more watcher entities that are subscribed to receive the SIP event information associated with the requesting watcher entity;
  accessing, at the WINFO server, the SIP event subscription information to locate the watcher entity subscription information associated with the requesting watched entity; and
  providing, to the requesting watched entity, the watcher entity subscription information associated with the requesting watched entity.

18. The non-transitory computer readable medium of claim 17 wherein the watcher entity subscription information includes a watcher entity identifier and at least one of: a SIP event subscription expiration time associated with the watcher entity or a pending SIP event subscription request from the watcher entity.

19. The non-transitory computer readable medium of claim 17 wherein the one or more notifier servers includes one or more resource list servers.

20. The non-transitory computer readable medium of claim 17 wherein the one or more notifier servers includes one or more presence service servers.

21. The non-transitory computer readable medium of claim 17 wherein the requesting watched entity includes at least one of a requesting watched subscriber entity or a requesting watched resource entity.

22. The non-transitory computer readable medium of claim 17 wherein the SIP event subscription information at least one of presence service subscription information, dialog subscription information, voice mail subscription information, automatic callback subscription information, PSTN and Internet Internetworking (PINT) subscription information, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, or XCAP document change information.

23. The non-transitory computer readable medium of claim 17 wherein the SIP event information includes presence service information.

24. The non-transitory computer readable medium of claim 17 wherein the SIP event subscription information includes presence service subscription information comprising a watcher entity identifier, a watched entity identifier, and subscription details.

* * * * *